United States Patent
Wei et al.

(10) Patent No.: US 10,320,627 B2
(45) Date of Patent: Jun. 11, 2019

(54) COOPERATIVE COVERAGE METHOD OF INFORMATION PERCEPTION FOR DISTRIBUTED NETWORK

(71) Applicants: STATE GRID JIANGSU ELECTRIC POWER COMPANY NANJING POWER SUPPLY COMPANY, Nanjing (CN); STATE GRID JIANGSU ELECTRIC POWER COMPANY, Nanjing (CN); STATE GRID COMPANY CORPORATION OF CHINA, Beijing (CN); STATE GRID INFORMATION & TELECOMMUNICATION GROUP CO., LTD, Beijing (CN)

(72) Inventors: Lei Wei, Nanjing (CN); Min Lu, Nanjing (CN); Qinghai Ou, Beijing (CN); Zhu Liu, Beijing (CN); Shaoyong Guo, Beijing (CN); Wei Xu, Nanjing (CN); Dong Yan, Nanjing (CN); Shaojun Liu, Nanjing (CN); Xinjian Zhao, Nanjing (CN); Wei Li, Nanjing (CN); Lisha Gao, Nanjing (CN)

(73) Assignees: STATE GRID JIANGSU ELECTRIC POWER COMPANY NANJING POWER SUPPLY COMPANY, Nanjing (CN); STATE GRID JIANGSU ELECTRIC POWER COMPANY, STATE GRID COMPANY CORPORATION OF CHINA, Nanjing (CN); STATE GRID INFORMATION & TELECOMMUNICATION GROUP CO., LTD, Beijing (CN)

( * ) Notice: Subject to any disclaimer, the term of this patent is extended or adjusted under 35 U.S.C. 154(b) by 168 days.

(21) Appl. No.: 15/323,111

(22) PCT Filed: Apr. 29, 2016

(86) PCT No.: PCT/CN2016/080845
§ 371 (c)(1),
(2) Date: Dec. 30, 2016

(87) PCT Pub. No.: WO2017/128547
PCT Pub. Date: Aug. 3, 2017

(65) Prior Publication Data
US 2018/0176103 A1 Jun. 21, 2018

(30) Foreign Application Priority Data
Jan. 29, 2016 (CN) .......................... 2016 1 0066977

(51) Int. Cl.
*H04L 12/26* (2006.01)
*H04W 16/18* (2009.01)
*H04W 84/18* (2009.01)

(52) U.S. Cl.
CPC ............ *H04L 43/028* (2013.01); *H04L 43/08* (2013.01); *H04W 16/18* (2013.01); *H04W 84/18* (2013.01); *Y02D 70/00* (2018.01)

(58) Field of Classification Search
CPC .................................................... H04L 43/028
See application file for complete search history.

(56) References Cited

U.S. PATENT DOCUMENTS

2004/0149988 A1* 8/2004 Shiozaki ........... B32B 17/10788
257/53
2007/0266269 A1* 11/2007 Fuchikami ............ G06F 1/3203
713/322

(Continued)

FOREIGN PATENT DOCUMENTS

CN 103702276 4/2014
CN 104883301 9/2015

OTHER PUBLICATIONS

Xiang Cao."Extension of the Life Cycle of Wireless Sensor Network Monitoring System," Full-text Database of Excellent Chinese Master Dissertation, Journal of Information Science and Technology, Dec. 15, 2011, Issue 12 ISSN:1674-0246, p. 21-25.

(Continued)

*Primary Examiner* — Tonia L Dollinger
*Assistant Examiner* — Steven C Nguyen
(74) *Attorney, Agent, or Firm* — Treasure IP Group, LLC (57) ABSTRACT

This invention provides a cooperative coverage method for distribution network information perception. The cooperative coverage method includes the following steps: construction of connected cooperative coverage sets, which can cover all target nodes with as few information perception nodes as possible, and maintain the connectivity of each cooperative coverage set with connected sets construction methods based on of hierarchical clustering; Cooperative (Continued)

coverage set scheduling, introducing the concept of energy ratio threshold, dividing the life cycle of the system into multiple time slices, calculating the energy ratio of perception device set in each time slice to realize the set scheduling. The invention realizes the efficient utilization of the energy of the perception device through the construction and scheduling of the connected coverage set in different time slices, and improves the use efficiency of the information perception network.

6 Claims, 3 Drawing Sheets

(56) References Cited

U.S. PATENT DOCUMENTS

| | | | |
|---|---|---|---|
| 2013/0082526 A1* | 4/2013 | Lee | H02J 3/14 307/31 |
| 2014/0265563 A1* | 9/2014 | Schrader | H02J 1/00 307/18 |
| 2015/0326012 A1* | 11/2015 | Tsuchiya | H02J 7/35 307/20 |
| 2015/0373036 A1* | 12/2015 | Patne | H04L 63/1416 726/23 |

OTHER PUBLICATIONS

Xuesong Qiu "A Sensor Aggregation Layout Algorithm for Smart Grid Data Acquisition," Journal of Electronics & Information Technology, Oct. 31, 2015, vol. 10, issue 37, p. 2412-2414.

* cited by examiner

COOPERATIVE COVERAGE METHOD OF INFORMATION PERCEPTION FOR DISTRIBUTED NETWORK

CROSS REFERENCE TO RELATED APPLICATION

This application is a National Phase application of, and claims priority to, PCT Application No. PCT/CN2016/080845, filed on Apr. 29, 2016 entitled "COOPERATIVE COVERAGE METHOD OF INFORMATION PERCEPTION FOR DISTRIBUTED NETWORK," which claims priority to Chinese Application No. 2016100669772, filed on Feb. 1, 2016. Both the PCT Application and Chinese Application are incorporated herein by reference in their entireties.

TECHNICAL FIELD

The present invention relates to a cooperative coverage method for sensor networks, and more particularly to a cooperative coverage method for network information perception.

BACKGROUND ART

With the continuous expansion of the scale of the power grid, the consumption of energy and natural resources is increasing, and distributed power generation technology has gained more and more attention and application. Distributed energy can flexibly access and cut out the power grid in the form of microgrid organization, and become an important part of the smart grid. Although the microgrid can realize the effective control and management of the distributed energy, but the inherent randomness and intermittence of the distributed energy still have the impact on the stability of the power grid. Therefore, it is necessary to monitor the status of equipment and network in the microgrid. The power flow is calculated by monitoring the voltage at each pivot point, the voltage and phase angle of the equilibrium point to analyze the power distribution, loss, voltage distribution and other aspects of each branch, In addition, through the monitoring temperature, humidity, frequency and other state information to analyze whether there is a fault, determine the type of fault, so as to solve the problem in time.

In order to obtain a large number of accurate and comprehensive information on the status of the equipment and network, according to the different requirements of each target node in the distribution network, various types of corresponding information perception devices are needed to deploy to monitor the status data such as voltage, temperature, humidity, frequency and so on. However, traditional coverage methods cannot meet the different monitoring requirements of different target nodes in the distribution network. The transmission of a large number of monitoring data will speed up the energy consumption of information perception device nodes and shorten the information perception network life cycle. Therefore, how to realize the efficient use of the energy of the perception device and improve the efficiency of the information perception network becomes a problem to be solved.

CONTENTS OF THE INVENTION

The technical problem to be solved by the invention is that the transmission of a large number of monitoring data generated by the cooperative coverage causes the problem of shortening the life cycle of the perception network.

In order to solve the above technical problem, the present invention provides a cooperative coverage method for information perception of the distribution network, comprising the following steps:

Step 1: Selecting the information perception device coverage set, and prioritized activation sorting of each information perception device in the target area according to a collation rule, then select the information perception device at the top of the sort to join the information perception coverage set. And repeat the above prioritized activation sorting and selection process for the remaining unselected information perception devices until the entire target nodes within the target area are covered;

Step 2: Connecting information perception device coverage set. The hierarchical clustering method is used to connect the data processing center nodes and the information perception devices in the information perception device coverage set to realize the interconnection between the information perception devices, the information perception devices and the data processing center nodes;

Step 3: Scheduling information perception device coverage set. Calculating the node consumption value of the most energy-consuming information perception device in the information perception device coverage set and the aggregate energy of the information perception device coverage set, when the energy ratio between the node consumption value and the aggregate energy exceeds the scheduling threshold, the information perception device is set into the sleep state and returns to step 1 to reselect the information perception device coverage set.

The use of prioritized activation sorting allows the selection of better-performing information perception devices to join the information perception device coverage set, so that the information perception device coverage set always keeps the better operation state; the hierarchical clustering method is adopted to realize the connectivity between the nodes in the information perception device coverage set, so that the information perception device coverage set always keeps a small node scale and avoids energy waste; The scheduling of information perception device coverage set can reconstruct a new information perception device coverage set before the life cycle of the information perception device is over, to achieve energy efficiently use of information perception devices through coordinated scheduling in different time slices, to improve the efficiency of information perception networks, and to ensure the reliability of information perception equipment coverage data transmission.

As a further limitation of the present invention, the sorting rule set in step 1 is such that in each information perception device whose residual energy exceeds the energy threshold, the priority activation sorting is performed according to the number of coverage target nodes and the number of times that activation has been selected. Setting the energy threshold ensures that the information perception devices that are selected to be active are sufficiently energy to ensure that the selected information perception device coverage can operate reliably for long periods of time.

As a further limitation of the present invention, in step 1, the specific step of prioritizing activation sorting is:

Step 1.1 Acquires the number ($num_1$) of target nodes covered by each information perception device in the target area, and the number of times ($num_2$) that each information perception device have been selected to activate;

Step 1.2 According to the formula $num_1 - \omega num_2$ to calculate the priority activation value of each information perception device, and prioritize the activation order according to the order of priority activation value, where ω is calculating proportional coefficient of $num_2$ the number of times.

By calculating the priority activation value of each information perception device, the number ($num_1$) of coverage target nodes and the number ($num_2$) of times that have been selected to be activated can be combined, not only combine the coverage value and the residual energy, but also facilitate the calculation of prioritizing activation sorting.

As a further limitation of the present invention, in step 1.1, the specific steps for acquiring the number ($num_1$) of target nodes covered by each information perception device in the target area and the number of times ($num_2$) that each information perception device has been selected to activate are:

Step 1.1.1: All target nodes in the target area are numbered, and each target node maintains a deployment table including the kind of information perception devices required by the target node and whether the target node has selected the corresponding kinds of information perception devices to monitor the target node, and initializing all values in the deployment table to 1, and if the corresponding information perception device has been selected, set the type of the corresponding information perception device to 0, otherwise set to 1;

Step 1.1.2: Each information perception device in the target area maintains an coverage table for recording the number of target nodes can be covered by each information perception device. Each information perception device has an energy remaining value that records the remaining energy of each information perception device and the number of times $num_2$ that the information perception device has been selected to activate the work;

Step 1.1.3: According to the number of the target node for each query calculation, for the i target node, query its deployment table firstly. If there is no corresponding type of information perception device in the deployment table of the target node, then skip this target node to make the query calculation for the i+1 target node. If there is a corresponding type of information perception device and the corresponding value in the deployment table is 1, calculating whether the distance between the information perception device and the target node is less than or equal to the coverage radius of the information perception device; if less than or equal to, the target node number i is recorded in the coverage table of the information perception device, otherwise skip the target node to make the query calculation for the i+1 target node until all the target nodes have been inquired and calculated;

Step 1.1.4: Querying the coverage tables of the each information perception device, obtaining $num_1$ the number of coverage target nodes recorded in each coverage tables.

By judging whether the corresponding position in the deployment table is 0 or 1, can quickly determine that the corresponding target node has selected or not selected such information perception devices to cover, effectively improving the statistical calculation efficiency, and avoiding the repetition of the selection of the target node of the selected information perception device, to ensure that the information perception device has a high utilization rate, also to avoid the energy loss caused by unnecessary duplicated data transmission.

As a further limitation of the present invention, proportional coefficient ω is in the range of 0.4~0.6. The range of 0.4~0.6 can satisfy the distribution characteristics of the target node in the distribution network.

As a further limitation of the present invention, in step 2, using the hierarchical clustering method to connect the data processing center nodes and the information perception devices in the information perception device coverage set, the specific steps are:

Step 2.1: According to the regional location, the processing center and all nodes in the information perception device coverage set are divided into several groups, each group includes at least two nodes, each node in the group can communicate with each other;

Step 2.2: Calculating the distance between the nearest information perception device nodes in any two groups, and selecting the two groups with the closest distance;

Step 2.3: Finding the information perception device which is between the two nearest groups in the target area and the remaining energy exceeds the energy threshold as the relay node, adding the relay node into one of the two groups;

Step 2.4: After the relay node is added, if the two groups can communicate with each other, the two groups are combined into one group. If the two groups cannot communicate with each other, repeat step 2.3 until the two groups can be combined into one group;

Step 2.5: Steps 2.2 to 2.3 are repeated until all the groups are combined into one large group, that is, to realize the interconnection between the information perception devices, the information perception device and the data processing center node.

It can ensure that the information perception device coverage set always keeps a small node size by gradually adding one or more information perception device nodes between the two groups as the relay nodes until the two groups can communicate with each other, avoid the energy waste of the node.

As a further limitation of the present invention, in step 3, calculating the node consumption value of the most energy-consuming information perception device in the information perception device coverage set and the aggregate energy of the information perception device coverage set, the specific steps are:

Step 3.1: Suppose there are m information perception devices in the j-th constructed information perception device coverage set, where the remaining energy of the i-th information perception device is $er_i$ and the energy consumption per unit time segment is $e_{it}$, then the number of continuous operation time slices used by the nodes of the most energy-consuming information perception device in the set is expressed as:

$$x_j = \min_{i=\{1,2\ldots m\}} \frac{er_i}{e_{it}}$$

From the above formula, it can be seen that the range of the number of time slices that the j-th constructed information perception device coverage set can work continuously is $(0, x_j]$;

Step 3.2: The aggregate energy of the information perception device coverage set corresponds to the maximum life-cycle, then the total energy of the set is expressed as the sum of the number of work time slices of each information perception device:

$$l = \sum_{j=1}^{n} y_j, \ y_j \in [0, \ x_j], \ x_j = \min_{i=\{1,2m\}} \frac{er_i}{e_{it}}.$$

By introducing time slices to represent the concept of lifetime of nodes and total life of the set, it is more convenient to calculate the energy ratio accurately after discretization, and compare with the scheduling threshold to obtain more accurate and reliable scheduling control.

The invention has the advantages that: (1) The use of prioritized activation sorting allows the selection of better-performing information perception devices to join the information perception device coverage set, so that the information perception device coverage set always keeps the better operation state; (2) the hierarchical clustering method is adopted to realize the connectivity between the nodes in the information perception device coverage set, so that the information perception device coverage set always keeps a small node scale and avoids energy waste; (3) The scheduling of information perception device coverage set can reconstruct a new information perception device coverage set before the life cycle of the information perception device is over, to achieve energy efficiently use of information perception devices through coordinated scheduling in different time slices, to improve the efficiency of information perception networks, and to ensure the reliability of information perception equipment coverage data transmission.

MODE OF CARRYING OUT THE INVENTION

The embodiments of the present invention will be described in further detail with reference to the appended drawings and examples. The following embodiments are intended to illustrate the present invention, but are not intended to limit the scope of the invention.

The core idea of the invention is the cooperative coverage method. It is divided into three parts, namely, the selection of coverage set, the connected set construction based on hierarchical clustering and information perception device set scheduling. Cooperative coverage set selection combines the residual energy of information perception device nodes and the number of coverage nodes to sort the information perception devices, and selects the information perception devices at the top of the coverage table to join the coverage set to ensure that the optimal cooperative coverage set satisfying all target node coverage requirements in the region is generated. However, it is necessary to judge whether the coverage set can be selected. If it can be selected, the construction of the connected set is further carried out; otherwise, the life cycle of the information perception device network ends. The connected set is based on the hierarchical clustering method, considering the energy and distance to construct the connected information perception device cooperative coverage set. The scheduling of information perception devices set can determine the number of time-slices that the constructed information perception device set need to work by calculating the energy ratio and other parameters, so as to realize the extension of the network life cycle.

Figure 1:
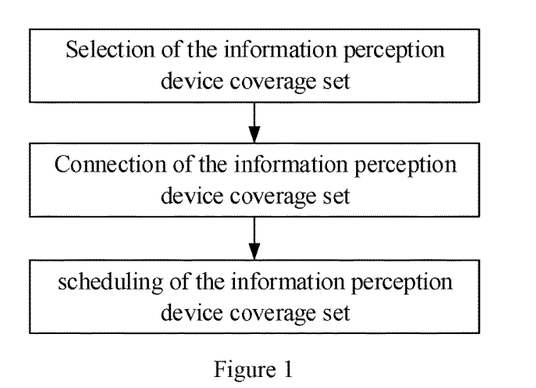
FIG. 1 provides the whole process of the cooperative coverage method of the network information perception.

As shown in FIG. 1, the cooperative coverage method for information perception of distribution network of present invention includes the following steps:

Step 1: Selecting the information perception device coverage set, and prioritized activation sorting of each information perception device in the target area according to a collation rule, then select the information perception device at the top of the sort to join the information perception coverage set. And repeat the above prioritized activation sorting and selection process for the remaining unselected information perception devices until the entire target nodes within the target area are covered;

Step 2: Connecting information perception device coverage set. The hierarchical clustering method is used to connect the data processing center nodes and the information perception devices in the information perception device coverage set to realize the interconnection between the information perception devices, the information perception devices and the data processing center nodes;

Step 3: Scheduling information perception device coverage set. Calculating the node consumption value of the most energy-consuming information perception device in the information perception device coverage set and the aggregate energy of the information perception device coverage set, when the energy ratio between the node consumption value and the aggregate energy exceeds the scheduling threshold, the information perception device is set into the sleep state and returns to step 1 to reselect the information perception device coverage set.

Figure 2:
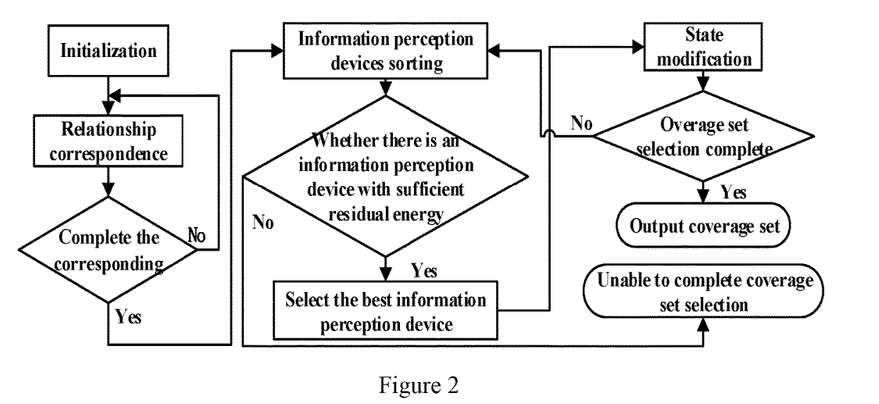
FIG. 2 provides the flow chart for the selection of the coverage set.

As shown in FIG. 2, in step 1, the set collation is: in each of the information sensing devices whose remaining energy exceeds the energy threshold, the priority activation ordering is performed according to the number of coverage target nodes and the number of times that activation has been selected. The specific steps for prioritizing activation are:

Step 1.1 Acquires the number (num$_1$) of target nodes covered by each information perception device in the target area, and the number of times (num$_2$) that each information perception device have been selected to activate, the specific steps are:

Step 1.1.1: All target nodes in the target area are numbered, and each target node maintains a deployment table. There are two rows in the deployment table, \respectively, including the kind of information perception devices required by the target node and whether the target node has selected the corresponding kinds of information perception devices to monitor the target node, and initializing all values in the deployment table to 1, and if the corresponding information perception device has been selected, set the type of the corresponding information perception device to 0, otherwise set to 1;

Step 1.1.2: Each information perception device in the target area maintains a coverage table for recording the number of target nodes can be covered by each information perception device. Each information perception device has an energy remaining value that records the remaining energy of each information perception device and the number of times $num_2$ that the information perception device has been selected to activate the work;

Step 1.1.3: According to the number of the target node for each query calculation, for the i target node, query its deployment table firstly. If there is no corresponding type of information perception device in the deployment table of the target node, then skip this target node to make the query calculation for the i+1 target node. If there is a corresponding type of information perception device and the corresponding value in the deployment table is 1, calculating whether the distance between the information perception device and the target node is less than or equal to the coverage radius of the information perception device; if less than or equal to, the target node number i is recorded in the coverage table of the information perception device, otherwise skip the target node to make the query calculation for the i+1 target node until all the target nodes have been inquired and calculated. It should be noted that to calculate the number of target nodes (coverage values) that can be covered by each information perception device, pay attention to that it need to query the information table of the corresponding target node when calculating, the value of 1 can increase the coverage value of the information perception device;

Step 1.1.4: Querying the coverage tables of the each information perception device, obtaining $num_1$ the number of coverage target nodes recorded in each coverage tables;

Step 1.2 According to the formula $num_1-\omega num_2$ to calculate the priority activation value of each information perception device, and prioritize the activation order according to the order of priority activation value, different types of information perception devices are sorted separately, where $\omega$ is calculating proportional coefficient of $num_2$ the number of times. $num_1-\omega num_2$ is used to sort combine with the coverage set and the selection times, and the proportional coefficient $\omega$ is set according to the specific situation. The proportional coefficient $\omega$ is in the range of 0.4~0.6, and the present invention preferentially selects $\omega$=0.5. In the selection, it is necessary to select an information perception device that is at the top of the priority activation sorting and whose residual energy exceeds the threshold to join the information perception device coverage set, to select the best information perception device nodes in each type of information perception device separately; If an information perception device node is selected, the corresponding position of the deployment table of all target nodes that the information perception device can cover is 0, indicating that the corresponding target node has selected such information perception device to cover; the priority activation sorting of the information perception device is repeatedly executed, the process of selecting the best information perception device node and the state modification are performed until the coverage of all the target nodes is completed, then the coverage set selection is completed. If such a coverage set cannot be found, the lifecycle of information perception device network in the microgrid ends.

Figure 3:
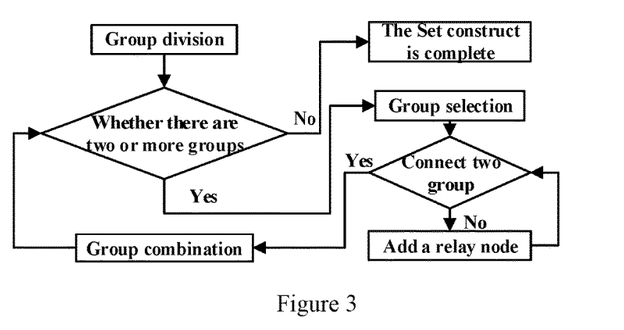
FIG. 3 provides the flow chart for the connection of the coverage set.

As shown in FIG. 3, in step 2, using the hierarchical clustering method to connect the data processing center nodes and the information perception devices in the information perception device coverage set, the specific steps are:

Step 2.1: Regarding the data processing center as a node, according to the regional location the processing center and all nodes in the information perception device coverage set are divided into several groups, each group includes at least two nodes, each node in the group can communicate with each other, no isolated nodes in the group, and no connection between any two groups;

Step 2.2: Calculating the distance between the nearest information perception device nodes in any two groups, and selecting the two groups with the closest distance;

Step 2.3: Finding the information perception device which is between the two nearest groups in the target area and the remaining energy exceeds the energy threshold as the relay node, adding the relay node into one of the two groups;

Step 2.4: After the relay node is added, if the two groups can communicate with each other, the two groups are combined into one group. If the two groups cannot communicate with each other, repeat step 2.3 until the two groups can be combined into one group;

Step 2.5: Repeating group selection, adding the relay node, and combining groups of steps 2.2 to 2.3 until all the groups are combined into one large group, that is, to realize the interconnection between the information perception devices, the information perception device and the data processing center node.

In step 3 of the present invention, calculating the node consumption value of the most energy-consuming information perception device in the information perception device coverage set and the aggregate energy of the information perception device coverage set, the specific steps are:

Step 3.1: Suppose there are m information perception devices in the J-th constructed information perception device coverage set, where the remaining energy of the i-th information perception device is $er_i$ and the energy consumption per unit time segment is $e_{it}$, then the number of continuous operation time slices used by the nodes of the most energy-consuming information perception device in the set is expressed as:

$$x_j = \min_{i=[1,2\,m]} \frac{er_i}{e_{it}}$$

From the above formula, it can be seen that the range of the number of time slices that the j-th constructed information perception device coverage set can work continuously is $(0, x_j]$;

Step 3.2: The aggregate energy of the information perception device coverage set corresponds to the maximum life-cycle, and the maximum life cycle can be expressed as the sum of the number of work time slices of each information-aware device, then the total energy of the set is expressed as the sum of the number of work time slices of each information perception device:

$$l = \sum_{j=1}^{n} y_j,\ y_j \in [0,\ x_j\,],\ x_j = \min_{i=[1,2\,m]} \frac{er_i}{e_{it}}.$$

Figure 4:
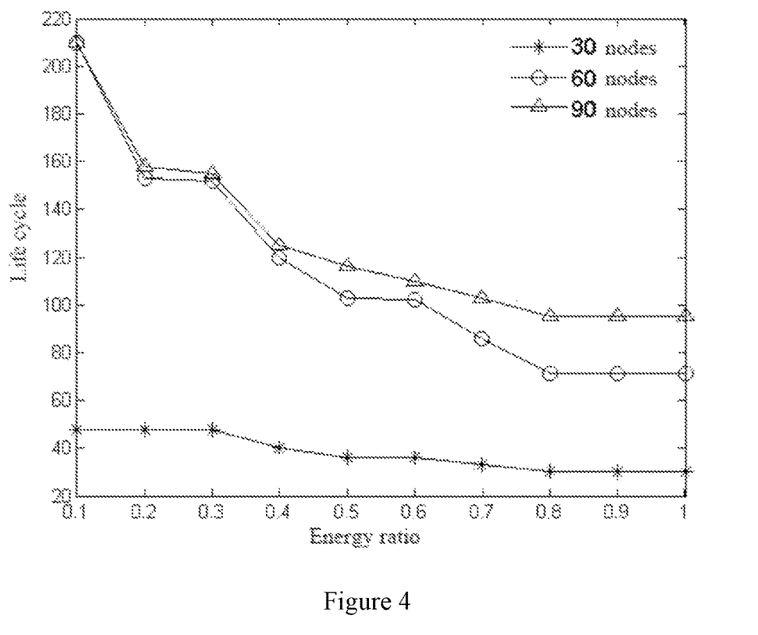
FIG. 4 provides the diagram for the change of life cycle of the information perception device coverage set along with energy ratio.
Figure 5:
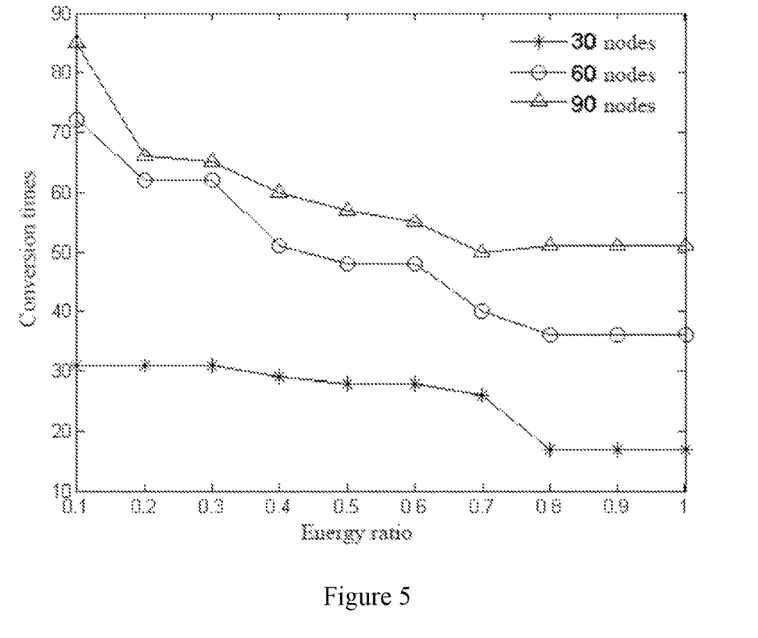
FIG. 5 provides the diagram for the change of the conversion times along with energy ratio.

As shown in FIG. 4 and FIG. 5, the present invention controls whether or not the information perception device coverage set enters a sleep state by setting an energy ratio $\lambda$ whose value range is $\lambda \in (0,1]$. The present invention performs a simulation experiment on the value of $\lambda$ to find the best value of λ. The invention randomly places 10 target nodes and three kinds of information perception device nodes in a 100×100 area to form a microgrid information perception device cooperative coverage to monitor simulation network. Each target node needs different types of information perception devices and randomly generated. The monitoring radius of the three types of information perception devices is 30, 40, and 50.

FIG. 4 shows the trend of the change of life cycle of the information perception device coverage set along with energy ratio when 30, 40 and 90 information perception devices are deployed respectively. Meanwhile, FIG. 5 shows the trend of the change of conversion times between different information perception devices sets along with energy ratio. It can be seen from FIG. 4 that the life cycle of the information perception device coverage set declines as the energy ratio increases. This is because when the λ is small, each information perception device coverage set work for a small number of time slices, the time of the selection of the optimal set is more, so the way of the information perception device works in turns is more optimized. However, λ is not the smaller the better performance, because the information perception devices start and sleep also need to consume energy, information perception devices frequently switch the state is not conducive to the stability of the system. It can be seen from FIG. 5, the conversions times of the information perception devices set decreases as the energy ratio increases. In order to balance the conversions times and the life cycle, 0.3 should be chose as the best energy ratio.

Figure 6:
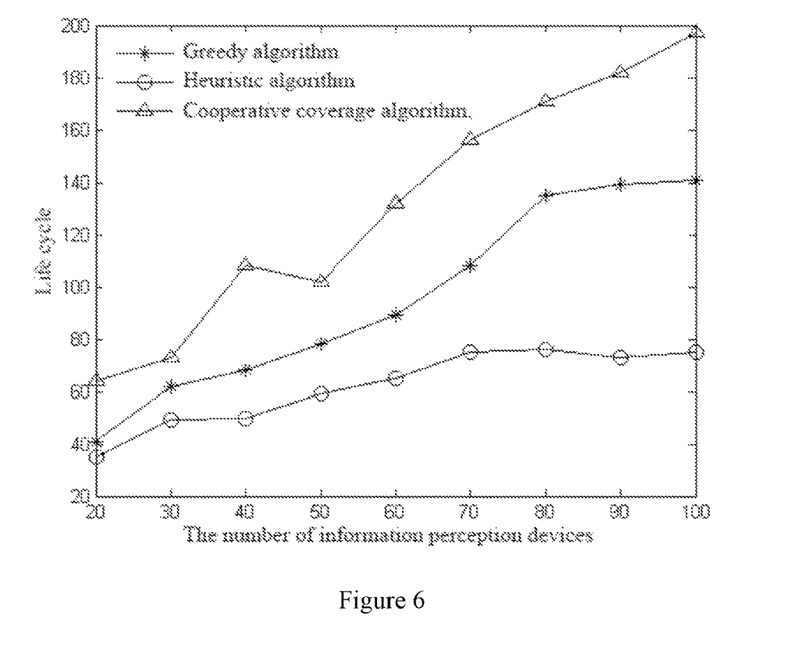
FIG. 6 provides the diagram for the change of life cycle along with the number of information perception devices under the cooperative coverage method and the other two methods.
Figure 7:
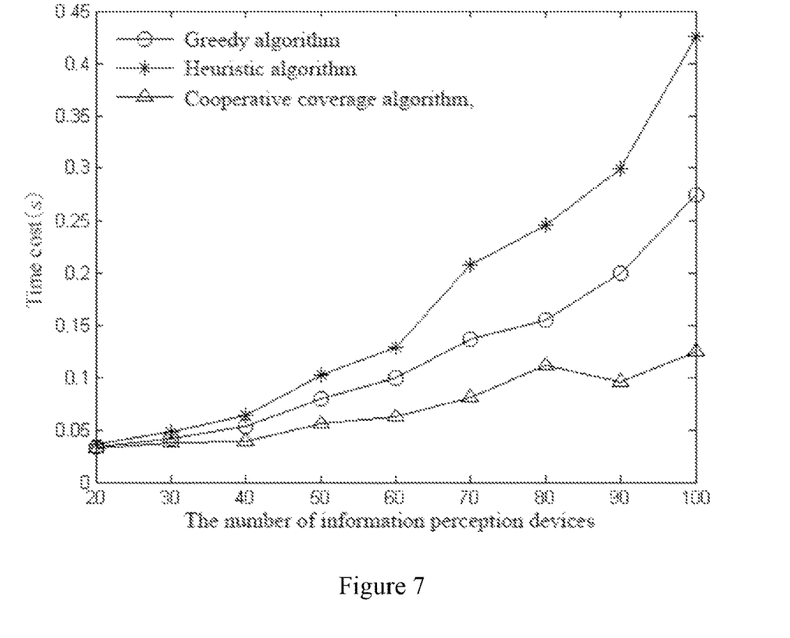
FIG. 7 provides the diagram for the change of the time overhead along with the number of information perception devices under the cooperative coverage method and the other two methods.

As shown in FIG. 6 and FIG. 7, respectively, showing the performance comparison of cooperative coverage algorithm, greedy algorithm and heuristic algorithm in terms of life cycle and algorithm time cost, when the number of nodes of each type of information perception devices is 20~100.

It can be seen from FIG. 6 that the life cycle of the information perception device network is increasing with the increase of the number of information perception devices, and the life cycle of the cooperative coverage method is the longest, the heuristic algorithm is the second, greedy algorithm is the last. As the number of nodes for information perception devices increases, the gap becomes more obvious. When the number of nodes is 100, the lifecycle of the cooperative coverage algorithm is 40% and 160% longer than that of the heuristic algorithm and greedy algorithms, respectively. FIG. 7 shows that with the increase in the number of nodes of information perception devices, the time overhead of the three algorithms increases, but the time cost of the cooperative coverage algorithm increases more slowly and more efficiently. It can be seen from FIG. 6 and FIG. 7 that the cooperative coverage algorithm can find better information perception device scheduling scheme with higher efficiency, prolong the life of information perception device network more effectively, and when the network size of information perception devices increases, the effect is more obvious.

We claim:

1. A cooperative coverage method for information perception of distribution network, characterized in that, comprising the following steps:

Step 1: Selecting an information perception device coverage set, and prioritizing activation sorting of each information perception device in a target area according to a collation rule, then selecting the information perception device at the top of the sort to join the information perception coverage set, repeating the above prioritized activation sorting and selection process for the remaining unselected information perception devices until the entire target nodes within the target area are covered;

Step 2: Connecting information perception device coverage set, the hierarchical clustering method is used to connect data processing center nodes and the information perception devices in the information perception device coverage set to realize the interconnection between the information perception devices, the information perception devices and the data processing center nodes;

Step 3: Scheduling information perception device coverage set, calculating a node consumption value of the most energy-consuming information perception device in the information perception device coverage set and an aggregate energy of the information perception device coverage set, when an energy ratio between the node consumption value and the aggregate energy exceeds a scheduling threshold, the information perception device is set into a sleep state and returns to step 1 to reselect the information perception device coverage set, wherein in step 3, calculating the node consumption value of the most energy-consuming information perception device in the information perception device coverage set and the aggregate energy of the information perception device coverage set, the specific steps are:

Step 3.1: Suppose there are m information perception devices in j-th constructed information perception device coverage set, where the remaining energy of the i-th information perception device is $er_i$ and the energy consumption per unit time segment is $e_{it}$, then the number of continuous operation time slices used by the nodes of the most energy-consuming information perception device in the set is expressed as:

$$x_j = \min_{i=\{1,2\ldots m\}} \frac{\lceil\lceil er_i \rceil\rceil}{e_{it}}$$

from the above formula, it can be seen that the range of the number of time slices that the j-th constructed information perception device coverage set can work continuously is $(0, x_j]$;

Step 3.2: The aggregate energy of the information perception device coverage set corresponds to the maximum life-cycle, then the total energy of the set is expressed as the sum of the number of work time slices of each information perception device:

$$l = \sum_{j=1}^{n} y_j, y_j \in [0, \ x_j], x_j = \min_{i=\{1,2\ldots m\}} \frac{\lceil\lceil er_i \rceil\rceil}{e_{it}}.$$

2. According to the cooperative coverage method for information perception of distribution network described in claim 1, characterized in that, in step 1, the set collation is:

in each of the information sensing devices whose remaining energy exceeds the energy threshold, the priority activation ordering is performed according to the number of coverage target nodes and the number of times that activation has been selected.

3. According to the cooperative coverage method for information perception of distribution network described in claim 1, characterized in that, in step 1, the specific steps for prioritizing activation are:

Step 1.1 Acquiring number ($num_1$) of target nodes covered by each information perception device in the target area, and the number of times ($num_2$) that each information perception device has been selected to activate;

Step 1.2 According to the formula $num_1 - \omega num_2$ to calculate the priority activation value of each information perception device, and prioritize the activation order according to the order of priority activation value, where $\omega$ is calculating proportional coefficient of $num_2$ the number of times.

4. According to the cooperative coverage method for information perception of distribution network described in claim 3, characterized in that, in step 1.1, the specific steps for acquiring the number ($num_1$) of target nodes covered by each information perception device in the target area and the number of times ($num_2$) that each information perception device has been selected to activate are:

Step 1.1.1: All target nodes in the target area are numbered, and each target node maintains a deployment table including the kind of information perception devices required by the target node and whether the target node has selected the corresponding kinds of information perception devices to monitor the target node, and initializing all values in the deployment table to 1, and if the corresponding information perception device has been selected, set the type of the corresponding information perception device to 0, otherwise set to 1;

Step 1.1.2: Each information perception device in the target area maintains a coverage table for recording the number of target nodes can be covered by each information perception device, each information perception device has an energy remaining value that records the remaining energy of each information perception device and the number of times that the information perception device has been selected to activate the work;

Step 1.1.3: According to the number of the target node for each query calculation, for the i target node, query its deployment table firstly, if there is no corresponding type of information perception device in the deployment table of the target node, then skip this target node to make the query calculation for the i+1 target node, if there is a corresponding type of information perception device and the corresponding value in the deployment table is 1, calculating whether the distance between the information perception device and the target node is less than or equal to the coverage radius of the information perception device; if less than or equal to, the target node number i is recorded in the coverage table of the information perception device, otherwise skip the target node to make the query calculation for the i+1 target node until all the target nodes have been inquired and calculated;

Step 1.1.4: Querying the coverage tables of each information perception device, obtaining $num_1$ the number of coverage target nodes recorded in each coverage tables.

5. According to the cooperative coverage method for information perception of distribution network described in claim 3, characterized in that, proportional coefficient $\omega$ is in the range 0.4~0.6.

6. According to the cooperative coverage method for information perception of distribution network described in claim 1, characterized in that, in step 2, using the hierarchical clustering method to connect the data processing center nodes and the information perception devices in the information perception device coverage set, the specific steps are:

Step 2.1: According to the regional location, the processing center and all nodes in the information perception device coverage set are divided into several groups, each group includes at least two nodes, each node in the group can communicate with each other;

Step 2.2: Calculating the distance between the nearest information perception device nodes in any two groups, and selecting the two groups with the closest distance;

Step 2.3: Finding the information perception device which is between the two nearest groups in the target area and the remaining energy exceeds the energy threshold as the relay node, adding the relay node into one of the two groups;

Step 2.4: After the relay node is added, if the two groups can communicate with each other, the two groups are combined into one group, if the two groups cannot communicate with each other, repeat step 2.3 until the two groups can be combined into one group;

Step 2.5: Steps 2.2 to 2.3 are repeated until all the groups are combined into one large group, that is, to realize the interconnection between the information perception devices, the information perception device and the data processing center node.

* * * * *